United States Patent [19]
Ponziana

[11] Patent Number: 6,066,933
[45] Date of Patent: May 23, 2000

[54] RAIN SENSING SYSTEM AND METHOD HAVING AUTOMATICALLY REGISTERED AND ORIENTED RAIN SENSOR

[76] Inventor: Richard L. Ponziana, c/o ITT Automotive Electrical Systems, Inc., P.O. Box 1804, Dayton, Ohio 45401-1804

[21] Appl. No.: 09/165,972

[22] Filed: Oct. 2, 1998

[51] Int. Cl.[7] .................................................. B60S 1/08
[52] U.S. Cl. .......................... 318/483; 318/480; 318/443; 318/DIG. 2
[58] Field of Search .................. 318/443, 444, 318/480, 483, DIG. 2

[56] References Cited

U.S. PATENT DOCUMENTS

| | | | |
|---|---|---|---|
| 4,476,419 | 10/1984 | Fukatsu et al. | 318/444 |
| 4,595,866 | 6/1986 | Fukatsu et al. | 318/444 |
| 5,266,873 | 11/1993 | Arditi et al. | 318/483 |
| 5,304,936 | 4/1994 | Buschur | 324/689 |

FOREIGN PATENT DOCUMENTS

| | | |
|---|---|---|
| 3735267 | 4/1989 | Germany . |
| 4019066 | 12/1991 | Germany . |
| 4214223 | 11/1993 | Germany . |

OTHER PUBLICATIONS

Patentbesprechung, P. Nr. P 7960, published Sep. 9, 1995.

*Primary Examiner*—Bentsu Ro
*Attorney, Agent, or Firm*—Jacox, Meckstroth & Jenkins

[57] ABSTRACT

This invention relates to a windshield wiping system and method which utilizes a rain sensor having a housing defining a first mounting area for mounting directly onto a mirror mount which is adhered to a windshield. The rain sensor housing also defines a second mounting area that defines a generally trapezoidally-shaped mount for receiving a mirror bracket in order to support a mirror. The rain sensor housing is an integral one-piece construction that automatically registers at least one sensor in operative relationship with the windshield and in a predetermined position and orientation relative to the windshield when the rain sensor is mounted on the mirror bracket.

23 Claims, 1 Drawing Sheet

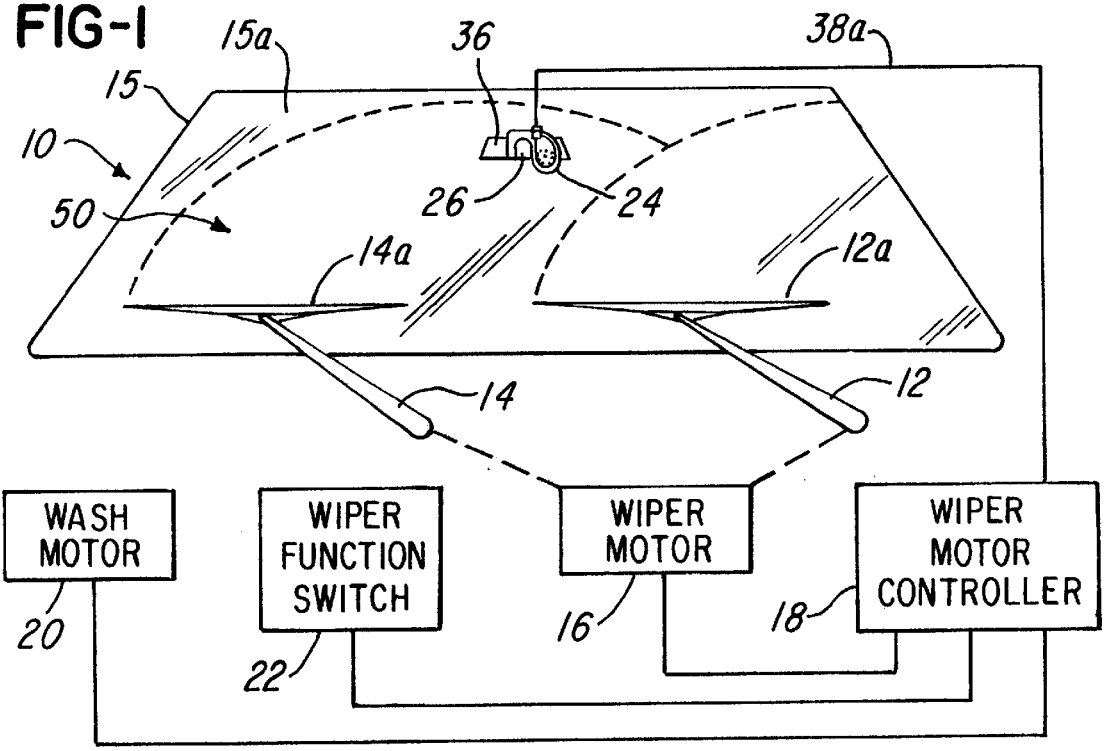
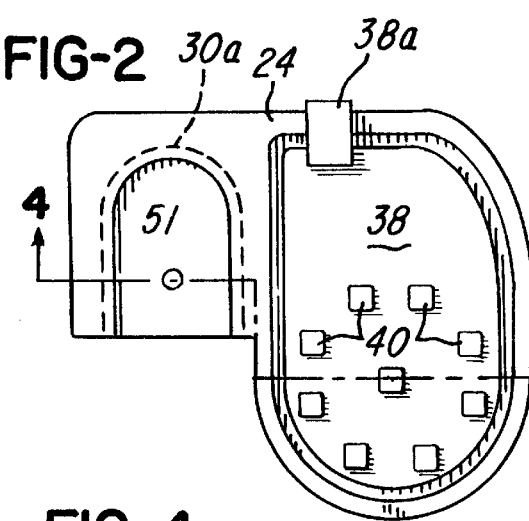
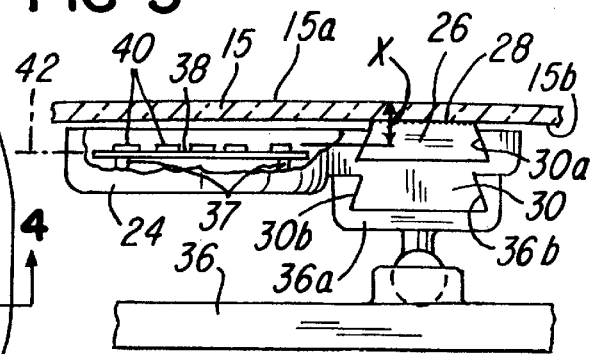
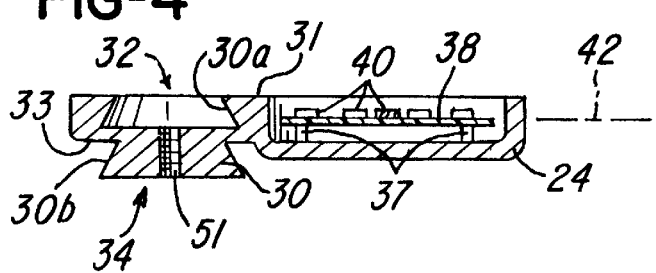

RAIN SENSING SYSTEM AND METHOD HAVING AUTOMATICALLY REGISTERED AND ORIENTED RAIN SENSOR

BACKGROUND OF THE INVENTION

1. Field of the Invention

This invention relates to a system and method for removing debris from a windshield and, more particularly, a system and method utilizing a rain sensor which becomes automatically registered relative to a windshield when the rain sensor is mounted on a mirror mount which is situated on the windshield and where the rain sensor includes a mounting area for mounting a mirror thereon.

2. Description of Related Art

In the field of windshield wiping the systems, rain sensors have been used to sense the presence or absence of debris on a surface of a windshield. Such sensors include capacitive-type sensors which are secured to the surface of the windshield and which detect the presence or absence of rain using a capacitor effect. Optical sensors that are adhered to the surface of the windshield have also been used to sense the presence or absence of rain on the windshield.

Typically, the rain sensors were mounted directly onto either an inner or outer surface of the windshield using an adhesive. In some cases, the rain sensors were integrally formed as part of the windshield. Unfortunately, if the windshield was cracked or broken, the rain sensor would oftentimes become inoperable. Also, if the rain sensor was defective or required maintenance, then the rain sensor would have to be pried off of the windshield which proved to be difficult and sometimes resulted in damage to either the windshield board or the rain sensor.

It was not uncommon that when a rain sensor was replaced, it became mis-registered so that the sensor was not properly registered relative to the windshield or the wipe pattern of the wipers. This resulted in the sensor not functioning properly to detect rain.

U.S. Pat. Nos. 5,304,936 and 5,266,873 and German patent references DE 42 14 223 A1; 40 19 066 A1 and DE 05 37 35 267 disclose various types of rain sensing systems and mountings utilized in the past.

Thus, a need exists for a windshield wiping system, which is easy to mount, and register, which is easy to service and maintain, and which does not have to be adhered directly to a surface of a windshield.

SUMMARY OF THE INVENTION

It is, therefore, a primary object of the invention to provide a rain sensing system and method that utilizes a rain sensor capable of utilizing a conventional mirror mount.

Another object of the invention is to provide a rain sensor having a housing defining a first mounting area for receiving a mirror mount which is situated on a windshield and also defining a second receiving area for receiving a mirror, such as a review mirror.

Still another object of the invention is to provide a rain sensor that can be easily replaced and/or maintained.

Yet another object of the invention is to provide a rain sensing system and method which facilitates automatic registration and positioning of the rain sensor relative to a surface and/or a wiper area of the windshield when the rain sensor is mounted on a mirror mount.

In one aspect, this invention comprises a rain sensor for mounting on a mirror mount situated on a windshield of an automobile, the rain sensor comprising a rain sensor housing, the rain sensor housing comprising a first mounting area for receiving the mirror mount and a second mounting area for receivably supporting a mirror; at least one sensor mounted on the rain sensor housing for detecting undesired debris on the windshield; the rain sensor be registered in a predetermined position relative to a surface of the windshield when the rain sensor is mounted on the mirror mount while simultaneously being capable of supporting the mirror for use by an operator.

In another aspect, this invention comprises a windshield wiping system comprising a plurality of windshield wipers for wiping a windshield; a drive motor; drive linkage coupling the drive motor to the plurality of windshield wipers; a controller for controlling operation of the drive motor; and a rain sensor coupled to the controller for sensing undesired debris on the windshield and for generating a signal in response thereto; the controller receiving the signal and energizing the drive motor to drive the plurality of windshield wipers in response thereto; the rain sensor comprising: a rain sensor housing, the rain sensor housing comprising a first mounting area for receiving a mirror mount situated on the windshield and a second mounting area for receivably supporting a mirror; at least one sensor mounted on the rain sensor housing for detecting undesired debris on the windshield; the rain sensor be registered in a predetermined position relative to a surface of the windshield when the rain sensor is mounted on the mirror mount while simultaneously being capable of supporting the mirror for use by an operator.

In still another aspect, this invention provides a method for removing debris from a windshield comprising the steps of: situating a mirror mount on a windshield; situating a rain sensor on the mirror mount; situating a mirror on the rain sensor; and coupling the rain sensor to a controller for causing a plurality of windshield wipers to wipe the windshield in response to the rain sensor sensing undesired debris on the windshield.

These objects, and others, may be more readily understood in connection with the following specification, claims in drawing.

BRIEF DESCRIPTION OF THE DRAWINGS

FIG. 1 is a schematic diagram showing a windshield wiping system in accordance with one embodiment of the invention;

FIG. 2 is a front view showing various features of a rain sensor and its housing;

FIG. 3 is a fragmentary sectional view showing the rain sensor illustrated in FIG. 2 mounted on a mirror mount which, in turn, is adhered to a surface of a windshield and also showing a mirror mounted on the rain sensor; and FIG. 4 is a sectional view taken along the line 4—4, showing an imaginary sensing plane, as well as various features of the invention.

DESCRIPTION OF THE PREFERRED EMBODIMENT

Referring now to the FIG. 1, a windshield wiping system 10 is shown comprising a plurality of windshield wipers 12 and 14 having a first wiper blade 12a and second wiper blade 14a, respectively, for wiping a windshield 15 of a vehicle (not shown). The wiper blades 12 and 14 are coupled to a wiper motor 16 which, in turn, is coupled to a wiper motor controller 18 which controls the operation of the windshield wiping system 10.

The windshield wiping system 10 may also comprise a washer motor 20 which is coupled and responsive to controller 18 for pumping windshield washer fluid (not shown) onto a windshield surface 16a. The windshield wiping system 10 may also comprise a wiper function switch 22 coupled to controller 18 for permitting an operator to turn the wiper system 10 on or off in a manner conventionally known.

The windshield wiping system 10 further comprises a rain sensor 24 which is removably mounted on a mirror mount 26 in a manner described later herein. The mirror mount 26 is mounted on an inner surface 15b of windshield 15 using a suitable adhesive 28 (FIG. 3).

As best illustrated in FIGS. 2–4, the rain sensor 24 comprises a rain sensor housing 30 that may be manufactured from any rigid plastic material or may be a metallic casting. The rain sensor housing 30 comprises a first side 31 having a first angled wall 30a (FIG. 4) which defines a first mounting area 32 for receiving the mirror mount 26 situated on the windshield 15. The rain sensor housing 30 further comprises a second side 33 defining a second angled wall 30b which defines a second mounting area 34 for receivably supporting a base 36a of a mirror 36.

As best illustrated in FIG. 4, the rain sensor housing 30 comprises a sensor circuit board 38 comprising at least one sensor 40 mounted directly onto the rain sensor housing 30 using suitable screws or fasteners 37. In the embodiment being described, the at least one sensor 24 comprises a plurality of optical sensors 40. In the embodiment being described, the optical sensors 40 comprises infrared sender, as labeled by part number 40a in FIG. 2, and at least one infrared receiver 40b (FIG. 2). The infrared sender 40a and receiver 40b operate in a spectrum of about 400–950 nanometers. One suitable circuit board 38 and rain sensor 24 has been found to be the part numbers 181.886 and 679.264, available from ITT Automotive Electrical Systems, Inc. of Dayton, Ohio, now known as Valeo. In the embodiment being described, the sensors 40 comprise a focal length from zero to about 20 inches toward the windshield surface and the sensors 40 sense the presence or absence of debris on the surface of windshield 15. The circuit board 38 is coupled to wiper motor controller 18 using connector 38a (FIG. 2) is using a conventional wire connector 19. The circuit board and sensors 24 are sufficiently designed to minimize wire count to the sensor 24.

As best illustrated in FIGS. 3 and 4, the sensors 40 lie in an imaginary plane 42. A feature of the present invention is that after rain sensor housing 30 is mounted on mirror mount 26, the plane 42 becomes registered in a generally parallel relationship to windshield 15, as best illustrated in FIG. 3. This facilitates causing sensors 40 to be situated in a predetermined position such that the sensors 40 arts situated a predetermined distance X (FIG. 3). In this embodiment, the distance X depends upon the design of sensor 40 and windshield area sensed, including consideration of the focal length mentioned earlier. This further facilitates ensuring that the sensors 40 are situated in a generally parallel relationship with respect to windshield 15, regardless of the rake or slant angle associated with the windshield 15, unless an unusual angle is required to sense a larger area.

Although not shown, it is envisioned that the sensor 24 may be position to sense across the windshield 15 (from left to right or right to left as viewed in FIG. 1) to obtain a larger sensed area which may improve the accuracy of the sensing. Moreover, it is also envisioned that a CCD camera may be provided as the sensor 24 and secured to the sensor housing 30 to facilitate sensing debris.

As best illustrated in FIGS. 1 and 2, the rain sensor housing 30 defines a generally L-shape so that when the rain sensor housing 30 is situated on the mirror mount 26, at least one of the sensors 40 become registered within a windshield wipe area 50 while facilitating keeping the housing 30 and sensor 24 out of the vehicle operators direct line of sight. The method of installation and operation of the windshield wiping system 10 will now be described.

After the mirror mount 26 is secured to windshield 15 using adhesive 28, the rain sensor housing 30 is mounted onto mirror mount 26. In this regard, sensor housing 30 may comprise a set screw 51 (FIG. 4) for securing the rain sensor housing 30 to be mirror mount 26.

After the rain sensor 24 is secured to the mirror mount 26, the mirror 36 may be secured to the second mounting area 30 defined by second mounting wall 30b. In this regard, the mounting base 36a of mirror 36 comprises an inner wall 36b which defines a shape which compliments the to be shape of the second mounting area 30. The mounting base 36a may also be provided with a set screw (not shown) for securely fastening mirror 36 to mount 30. After rain sensor 24 is mounted to mirror mount 26, the controller 18 may be coupled to circuit board 38 and sensors 40 via connector 38a and connector wire 19 (FIG. 1). Notice in FIGS. 3 and 4, the mounting area 30 and mounting area 32 define a generally trapezoidal or dove tail shape as shown to facilitate fastening the rain sensor 24 on the windshield 15 and the mirror 36 on the rain sensor 24.

The operator may choose to actuate the wiper function switch 22 which causes controller 18 to energize wiper motor or 16, thereby driving the wiper arms 12 and 14 and wiper blades 12a and 14a, respectively, to wipe surface 15a of windshield 15. Alternatively, rain sensor 24 may sense the presence of debris, such as rain, snow, ice, leaves or other debris when at least one of the sensors 40 of rain sensor 24 senses the debris and generates a sensing signal (not shown) which is received by controller 18. In response thereto, controller 18 causes wiper motor 16 to drive wiper arms 12 and 14, thereby driving wiper blades 12a and 14a, respectively. Controller 18 may include an algorithm that automatically stops wiper motor 16 if the sensors 40 failed to detect debris for a predetermined time interval that in the embodiment being described is controlled or selected by the driver. In this embodiment, the driver controls the sensitivity to debris. In this regard sensor 24 may be provided with a selector (not shown) which may be position either on the sensor 24 or associated with a steering column (not shown) in a manner conventionally known.

Thus, it should be appreciated that the windshield wiper system 10 provides means for automatically energizing wiper motor or 16 to wipe area 50.

Advantageously, this wiping system and method eliminates the need for an adhesive to mount rain sensor 24 in operative relationship with the windshield 15. The rain sensor 24 may be utilized with existing interior rear view mirror designs and mountings. Utilizing a traditional mirror mount has been found to provide a stable, consistent, strong and rigid method of mounting the rain sensor 24 in operative relationship with the windshield 15. Moreover, registration and placement of the rain sensor 24 onto windshield 15 becomes error proof and facilitates reducing or eliminating altogether traditional problems associated with mounting a rain sensor or on a windshield.

Situating the rain sensor 24 in the manner described herein further facilitates providing a consistent placement of sensors 40 relative to windshield 15 and accommodates providing a consistent focal length of said sensors 40 relative to an outer surface 15 A. of windshield 15. If the windshield 15 should break or crack, the rain sensor 24 will not be damaged because it is not adhered directly to windshield 15. Service to the rain sensor 24 is also greatly simplified in that the mirror 36 may be easily dismounted from rain sensor housing 30 and rain sensor 24 disconnected from controller 18 and dismounted from mirror mount 26 for easy maintenance, without having to pry the rain sensor 24 from the windshield 15. Also, when storing and inventorying replacement rain sensors one needs to no longer be concerned with shelf life of the adhesive or of excessive storage temperatures affecting adhesive properties.

The rain sensor 24 can be retrofitted onto existing vehicles having a traditional mirror mount and such retrofitting has been simplified over systems of the past.

While the method herein described, and the form of apparatus for carrying this method into effect, constitute preferred embodiments of the invention, it is to be understood that the invention is not limited to this precise method and form of apparatus, and that changes may be made in either without departing from the scope of the invention, which is defined in the appended claims.

What is claimed is:

1. A rain sensor for mounting on a mirror mount situated on a windshield of an automobile, said rain sensor comprising:

a rain sensor housing, said rain sensor housing comprising a first mounting area for receiving said mirror mount and a second mounting area for receivably supporting a mirror, wherein said mirror mount is mounted directly to said windshield;

at least one sensor mounted on said rain sensor housing within a passenger compartment of said automobile for detecting undesired debris on said windshield, said at least one sensor comprising a focal length of less than 20 inches toward the windshield surface;

said rain sensor be registered in a predetermined position relative to an inner surface of said windshield when said rain sensor is mounted on said mirror mount while simultaneously being capable of supporting said mirror for use by an operator.

2. The rain sensor as recited in claim 1 wherein said rain sensor housing is configured such that when said rain sensor housing is mounted on said mirror mount, said at least one sensor becomes registered to sense a windshield wipe area.

3. The rain sensor as recited in claim 1 wherein said at least one sensor comprises an infrared sensor having an operating range of at least 400 nanometers.

4. The rain sensor as recited in claim 1 wherein said at least one sensor is integral with said rain sensor housing.

5. The rain sensor as recited in claim 1 wherein said predetermined position comprises a predetermined distance and orientation between said at least one sensor and said windshield regardless of a rake angle associated with said windshield.

6. The rain sensor as recited in claim 5 wherein said at least one sensor defines a substantially planar sensing plane, said orientation being defined such that said planar sensing plane is substantially parallel to said windshield.

7. A rain sensor for mounting on a mirror mount situated on a windshield of an automobile, said rain sensor comprising:

a rain sensor housing, said rain sensor housing comprising a first mounting area for receiving said mirror mount and a second mounting area for receivably supporting a mirror;

at least one sensor mounted on said rain sensor housing for detecting undesired debris on said windshield;

said rain sensor be registered in a predetermined position relative to a surface of said windshield when said rain sensor is mounted on said mirror mount while simultaneously being capable of supporting said mirror for use by an operator;

said first mounting area and said mirror mount defines a trapezoid or dove tail in cross-section.

8. A windshield wiping system for a vehicle comprising:

a plurality of windshield wipers for wiping a windshield;

a drive motor;

drive linkage coupling said drive motor to said plurality of windshield wipers;

a controller for ;controlling operation of said drive motor; and a rain sensor coupled to said controller for sensing undesired debris on said windshield and for generating a signal in response thereto;

said controller receiving said signal and energizing said drive motor to drive said plurality of windshield wipers in response thereto;

said rain sensor comprising:

a rain sensor housing, said rain sensor housing comprising a first mounting area for receiving a mirror mount mounted on said windshield and a second mounting area for receivably supporting a mirror;

at least one sensor mounted within a passenger compartment of said vehicle on said rain sensor housing for detecting undesired debris on said windshield, said at least one sensor comprising a focal length of less than 20 inches toward the windshield surface;

said rain sensor be registered in a predetermined position relative to an inner surface of said windshield when said rain sensor is mounted on said mirror mount while simultaneously being capable of supporting said mirror for use by an operator.

9. The windshield wiping system as recited in claim 8 wherein said rain sensor housing is configured such that when said rain sensor housing is mounted on said mirror mount, said at least one sensor becomes registered to sense a windshield wipe area.

10. The windshield wiping system as recited in claim 9 wherein said at least one sensor comprises an infrared sensor having an operating range of at least 400 nanometers.

11. The windshield wiping system as recited in claim 8 wherein said at least one sensor is integral with said rain sensor housing.

12. The windshield wiping system as recited in claim 8 wherein said predetermined position comprises a predetermined distance and orientation between said at least one sensor and said windshield regardless of a rake angle associated with said windshield.

13. The rain sensor as recited in claim 12 wherein said at least one sensor defines a substantially planar sensing plane, said orientation being defined such that said planar sensing plane is substantially parallel to said windshield.

14. A windshield wiping system comprising:

a plurality of windshield wipers for wiping a windshield;

a drive motor;

drive linkage coupling said drive motor to said plurality of windshield wipers;

a controller for controlling operation of said drive motor; and a rain sensor coupled to said controller for sensing undesired debris on said windshield and for generating a signal in response thereto;

said controller receiving said signal and energizing said drive motor to drive said plurality of windshield wipers in response thereto;

said rain sensor comprising:

a rain sensor housing, said rain sensor housing comprising a first mounting area for receiving a mirror mount situated on said windshield, and a second mounting area for receivably supporting a mirror;

at least one sensor mounted on said rain sensor housing for detecting undesired debris on said windshield;

said rain sensor be registered in a predetermined position relative to a surface of said windshield when said rain sensor is mounted on said mirror mount while simultaneously being capable of supporting said mirror for use by an operator;

said first mounting area and said mirror mount defines a trapezoid or dove tail in cross-section.

15. A method for removing debris from a windshield of a vehicle comprising the steps of:

situating a mirror mount on an inner surface of a windshield and within a passenger compartment of the vehicle;

situating a rain sensor on said mirror mount, said rain sensor comprising a focal length of less than 20 inches toward the windshield surface;

situating a mirror on said rain sensor; and coupling said rain sensor to a controller for causing a plurality of windshield wipers to wipe said windshield in response to said rain sensor sensing undesired debris on said windshield.

16. The method as recited in claim 15 wherein said method further comprises the steps of:

providing a drive motor;

providing drive linkage for coupling to said drive motor to said plurality of windshield wipers;

said rain sensor further comprising:

a rain sensor housing, said rain sensor housing comprising a first mounting area for receiving said mirror mount situated on said windshield and a second mounting area for receivably supporting said mirror;

at least one sensor mounted on said rain sensor housing for detecting undesired debris on said windshield;

said rain sensor be registered in a predetermined position relative to a surface of said windshield when said rain sensor is mounted on said mirror mount while simultaneously being capable of supporting said mirror for use by an operator.

17. The method as recited in claim 16 wherein said rain sensor housing is configured such that when said rain sensor housing is mounted on said mirror mount, said at least one sensor becomes registered to sense a windshield wipe area.

18. The method as recited in claim 17 wherein said at least one sensor comprises a focal length of less than 20 inches.

19. The method as recited in claim 16 wherein said at least one sensor comprises an infrared sensor having an operating range of at least 400 nanometers.

20. The method as recited in claim 16 wherein said method further comprises the step of:

providing said at least one sensor which integral with said rain sensor housing.

21. The method as recited in claim 16 wherein said predetermined position comprises a predetermined distance and orientation between said at least one sensor and said windshield regardless of a rake angle associated with said windshield.

22. The method as recited in claim 21 wherein said at least one sensor defines a substantially planar sensing plane, said orientation being defined such that said planar sensing plane is substantially parallel to said windshield.

23. A method for removing debris from a windshield comprising the steps of:

situating a mirror mount on a windshield;

situating a rain sensor on said mirror mount;

situating a mirror on said rain sensor; and coupling said rain sensor to a controller for causing a plurality of windshield wipers to wipe said windshield in response to said rain sensor sensing undesired debris on said windshield;

said rain sensor and said mirror mount defines a trapezoid or dove tail in cross-section.

* * * * *